US012812260B2

(12) United States Patent
Chang et al.

(10) Patent No.: US 12,812,260 B2
(45) Date of Patent: Nov. 24, 2026

(54) SCANNING DEVICE AND SCANNING METHOD

(71) Applicant: Quanta Computer Inc., Taoyuan City (TW)

(72) Inventors: Chia-Yuan Chang, Taoyuan City (TW); Kai-Ju Cheng, Taoyuan City (TW); Yu-Chieh Huang, Taoyuan City (TW); Shao-Ang Chen, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 209 days.

(21) Appl. No.: 18/793,153

(22) Filed: Aug. 2, 2024

(65) Prior Publication Data

US 2025/0358536 A1 Nov. 20, 2025

(30) Foreign Application Priority Data

May 20, 2024 (TW) ................................ 113118562

(51) Int. Cl.
*H04N 23/95* (2023.01)
*G06T 7/73* (2017.01)

(52) U.S. Cl.
CPC ............... *H04N 23/95* (2023.01); *G06T 7/74* (2017.01); *G06T 2207/30036* (2013.01)

(58) Field of Classification Search
CPC . H04N 23/95; G06T 7/74; G06T 2207/30036; G06T 2207/10016; A61B 1/24; A61B 1/00009; A61B 1/00172; A61B 1/05; A61B 1/0676; G16H 30/20
See application file for complete search history.

(56) References Cited

U.S. PATENT DOCUMENTS 9,906,715 B2 * 2/2018 Yang .................... H04N 23/951
2009/0208133 A1 * 8/2009 Chang .................. G06F 3/0317 382/278
2011/0150363 A1 * 6/2011 Chen .................... G06F 3/0317 382/291
2012/0099773 A1 * 4/2012 Halmann ........... G01S 7/52046 600/440
2012/0176505 A1 * 7/2012 Kim .................... H04N 25/443 348/222.1

(Continued)

FOREIGN PATENT DOCUMENTS

CN 111759344 A 10/2020
TW 202404545 A 2/2024

OTHER PUBLICATIONS

Chinese language office action dated Oct. 17, 2024, issued in application No. TW 113118562.

*Primary Examiner* — John B Strege
(74) *Attorney, Agent, or Firm* — McClure, Qualey & Rodack, LLP

(57) ABSTRACT

Provided is a scanning device and a scanning method, which introduce high-speed photosensitive elements to assist in the calculation of movement trajectory. Taking advantage of the characteristics of the high-speed photosensitive elements, the scanning device is equipped with both a general photosensitive element and a high-speed photosensitive element. While scanning the target, it can also use the high-speed photosensitive element to obtain a more accurate movement trajectory.

10 Claims, 4 Drawing Sheets

(56) References Cited

U.S. PATENT DOCUMENTS

| | | | | |
|---|---|---|---|---|
| 2014/0306892 | A1* | 10/2014 | Lin | G09G 5/22<br>345/159 |
| 2025/0157015 | A1* | 5/2025 | Chen | G06T 7/11 |

* cited by examiner

SCANNING DEVICE AND SCANNING METHOD

CROSS REFERENCE TO RELATED APPLICATIONS

This application claims priority of Taiwan Patent Application No. 113118562, filed on May 20, 2024, the entirety of which is incorporated by reference herein.

BACKGROUND OF THE INVENTION

Field of the Invention

The present invention is related to a scanning device and scanning method, and in particular, it is related to a scanning device and scanning method that have both a general photosensitive element and a high-speed photosensitive element, and can obtain a more accurate movement trajectory.

Description of the Related Art

In general, scanning devices such as oral scanning devices mainly use cameras (or optical cameras) with high-resolution photosensitive elements to capture images of teeth and tissue surfaces while moving on the inner surface of the oral cavity. The movement trajectory of the camera within the oral cavity can be used to classify and evaluate the health status of different oral parts. However, the photosensitive elements used in regular cameras have a low frame rate (Frames per Second, FPS) and make it difficult to calculate accurate movement trajectories.

BRIEF SUMMARY OF THE INVENTION

In view of this, the present invention provides a scanning device and scanning method, which introduce high-speed photosensitive elements to assist in the calculation of movement trajectories. Taking advantage of the characteristics of high-speed photosensitive elements, the scanning device having both a camera (general photosensitive element) and a high-speed photosensitive element, can also use the high-speed photosensitive element to obtain a more accurate movement trajectory while scanning the target.

A scanning device according to one embodiment of the present invention includes a first photosensitive element (first imaging device), a second photosensitive element (second imaging device), a displacement calculation unit, and a data processing unit. The first photosensitive element is configured to scan and photograph a target object at a first frame rate to obtain a plurality of first frame-rate images. The second photosensitive element is configured to scan and photograph the target object at a second frame rate that is higher than the first frame rate to obtain a plurality of consecutive second frame-rate images. The displacement calculation unit is configured to calculate position variations between every two adjacent images in the second frame-rate images, thereby generating a plurality of displacement data. The data processing unit is configured to determine the amount of displacement between the current image and a previous image received from the first frame-rate images based on the displacement data.

In some embodiment, the data processing unit is further configured to sum up multiple displacement data between every two adjacent images in the second frame-rate images obtained during the period from receiving the previous image to receiving the current image in the first frame-rate images, to determine the amount of displacement between the current image and the previous image.

In some embodiment, the displacement calculation unit is configured to perform the following operations. The displacement calculation unit compares a first image and an adjacent second image in the second frame-rate images, and finds a first block and a second block with high similarity in the first image and the second image, respectively. Then, based on the relative positions of the first block and the second block, the displacement calculation unit calculates the amount of displacement of the first block and the second block in the first image and the second image, for use as the displacement data.

In some embodiment, the displacement calculation unit finds the first block and the second block with high similarity based on the principle of highest correlation coefficient or the smallest error.

In some embodiment, the first imaging device has a first resolution, the second imaging device has a second resolution, and the second resolution is lower than the first resolution.

In some embodiment, first imaging device and the second imaging device are arranged adjacent to one another in the scanning device. The scanning device is an oral scanning device, and the target object is teeth or oral tissue. In addition, the scanning device further includes one or more light sources.

A scanning method according to another embodiment of the present invention, is configured to perform the following steps. First, photograph the target object at a first frame rate (Frames per Second, FPS) to obtain a plurality of first frame-rate images, and photograph the target object at a second frame rate to obtain a plurality of consecutive second frame-rate images, wherein the second frame rate is higher than the first frame rate. Then, calculate the position variations between every two adjacent images in the consecutive second frame-rate images, thereby generating a plurality of displacement data. Next, based on the displacement data, obtain a displacement amount between the current image and a previous image received from the first frame-rate images.

In some embodiments, the scan method further includes to sum up multiple displacement data between every two adjacent images in the second frame-rate images obtained during the period from receiving the previous image to receiving the current image in the first frame-rate images, to determine the amount of displacement between the current image and the previous image.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In order to make the above-mentioned objects, features and advantages of the present invention more obvious and easy to understand, the following is a detailed description of the preferred embodiments and the accompanying drawings. The following description is made for the purpose of illustrating the general principles of the invention and should not be taken in a limiting sense. The scope of the invention is best determined by reference to the appended claims.

Figure 1:
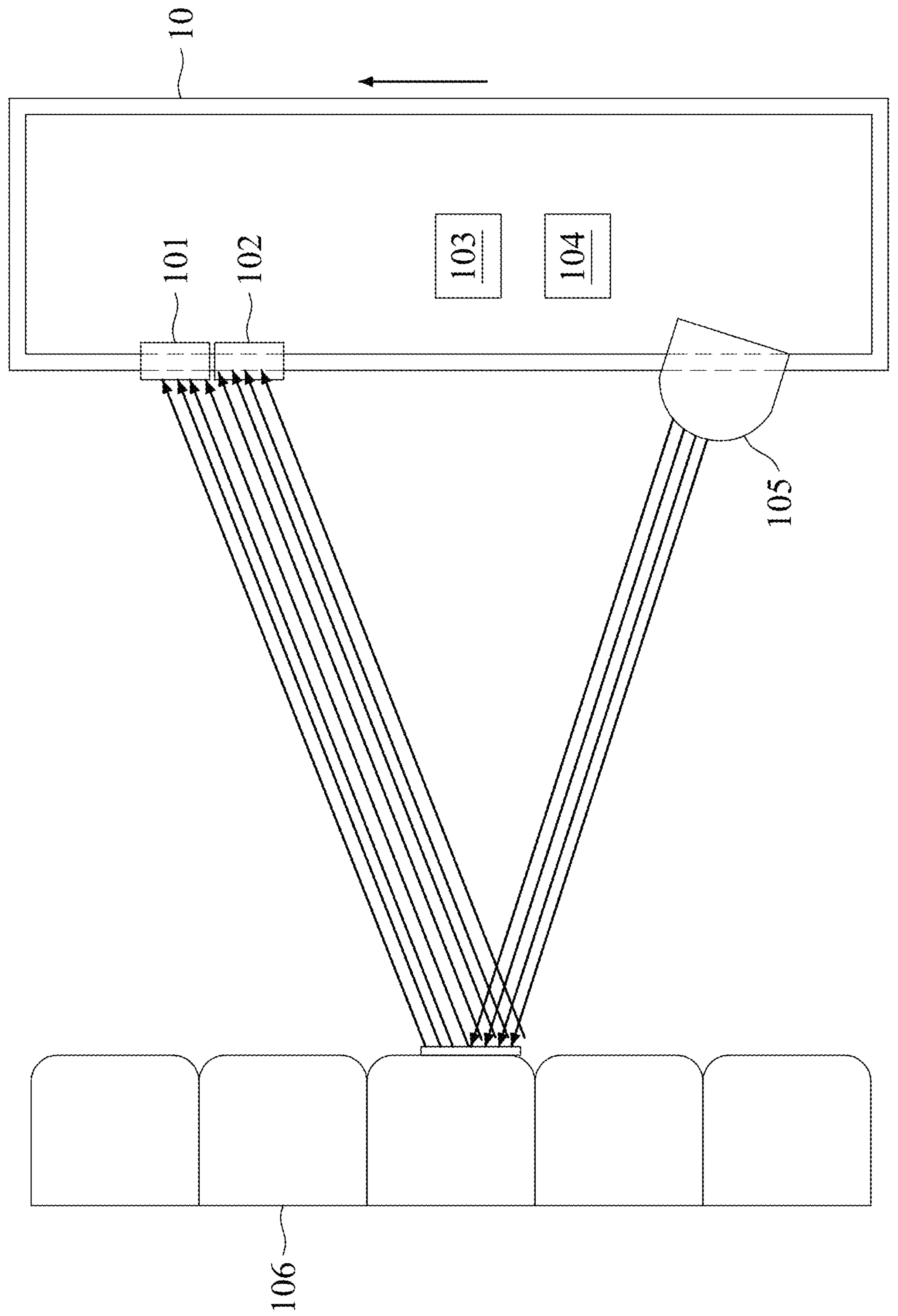
FIG. 1 shows a schematic diagram of a scanning device according to one embodiment of the present invention.

FIG. 1 shows a schematic diagram of a scanning device 10 according to one embodiment of the present invention. In FIG. 1, the scanning device 10 includes a first imaging unit 101, a second imaging unit 102, a displacement calculation unit 103, a data processing unit 104, and at least one light source 105. The light source 105 is, for example, but not limited to a light emitting diode (LED).

The first imaging unit 101 and the second imaging unit 102 may be two independent cameras (not shown), or they may be integrated into a single camera (not shown). The first imaging unit 101 may be a general photosensitive element; and the second imaging unit 102 may be a high-speed photosensitive element. In this embodiment, the imaging unit broadly refers to any device that can scan or photograph an object to form image, and in some categories functions equivalent to a photosensitive element. For the convenience of description, the general photosensitive element is also marked as 101 and the high-speed photosensitive element is marked as 102 for convenience of description.

In this embodiment, the comparison between the general photosensitive element 101 and the high-speed photosensitive element 102 is shown in Table 1 below.

In FIG. 1, when scanning the target object 106, the scanning device 10 illuminates the target object 106 with the light source 105. The general photosensitive element (the first imaging unit) 101 and the high-speed photosensitive element (the second imaging unit) 102 receive reflected light from the target object 106 and generate consecutive first frame-rate-images and consecutive second frame-rate-images, respectively. The arrow in FIG. 1 indicates the moving direction of the scanning device 10.

For every two adjacent images in the second frame-rate-images, the displacement calculation unit 103 calculates the position variation between the every two adjacent images, thereby generating a plurality of displacement data between the every two adjacent images. Here, the so-called adjacent images refer to two images that are before and after each other in time series.

Figure 2:
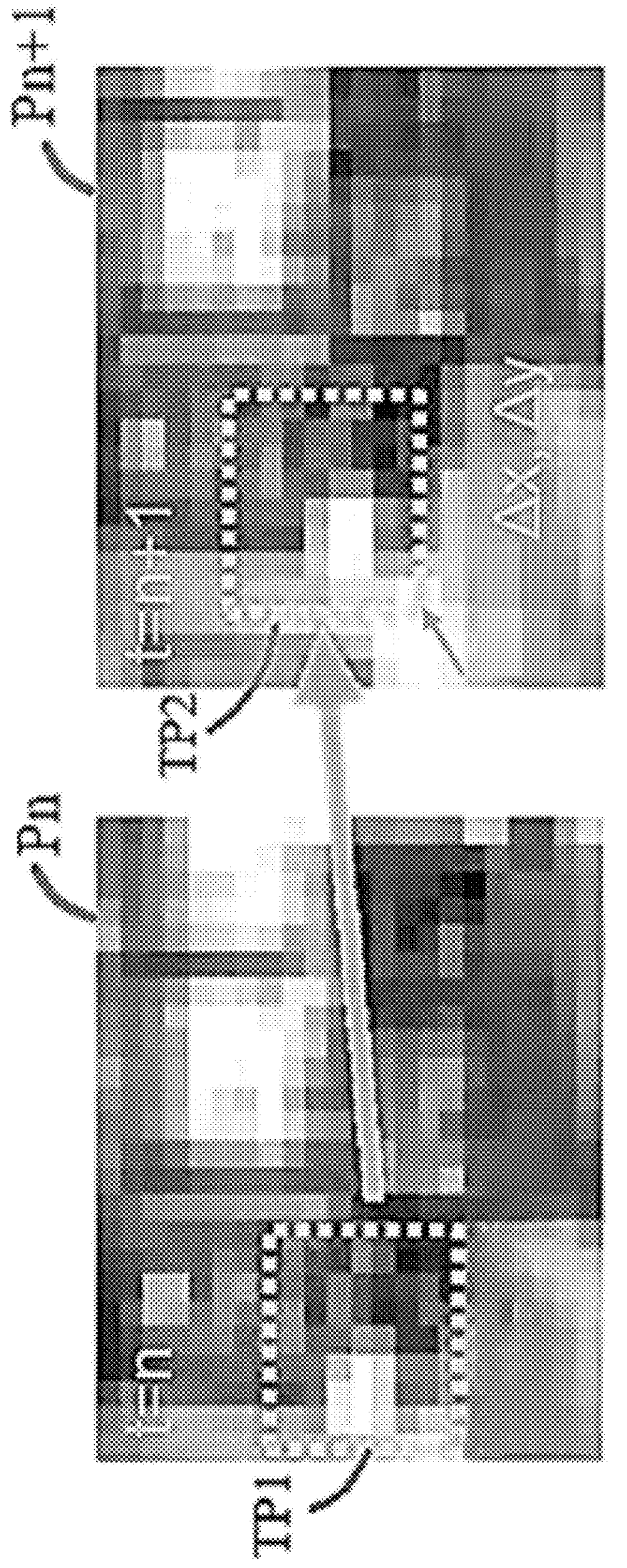
FIG. 2 shows a schematic diagram of the displacement of feature blocks TP1 and TP2 in two adjacent images Pn and Pn+1 in the second frame rate image.

Specifically, in the consecutive second frame-rate-images captured by the high-speed photosensitive element 102, any two adjacent images, such as the two images, Pn and Pn+1, are captured at time t=n and time t=n+1. Due to the high frame rate of the high-speed photosensitive element 102, the time difference between the two adjacent images Pn and Pn+1 is very short. Therefore, the displacement calculation unit 103 can find the same feature blocks in the image Pn and the image Pn+1. As shown in FIG. 2, in the second frame-rate-images, through the adjacent images Pn and Pn+1 captured at time t=n and time t=n+1, the same feature blocks TP1 and TP2 can be found.

In order to find the same feature blocks TP1 and TP2, first, the displacement calculation unit 103 performs image comparison on the two adjacent images Pn and Pn+1 in the second frame-rate images, to find the feature blocks TP1 and TP2 with high similarity, respectively in the two adjacent

TABLE 1

| | General photosensitive element | High-speed photosensitive element |
|---|---|---|
| Resolution | 1280 × 720 pixels, or above | Within 1280 × 720 pixels |
| Frames per Second: FPS | For example, less than 120 | Generally greater than 120, even up to 3000, 6000, etc. |

Table 1 is only an example and is not intended to limit the present invention. However, as can be seen from Table 1, the frame rate (Frames per Second, FPS) of high-speed photosensitive elements is higher than the frame rate of general photosensitive element. In this embodiment, the high-speed photosensitive element is used to track the displacement of image blocks on the surface of one scanned target object, so a higher frame rate is required, but a lower resolution can be used. General photosensitive elements are used to capture high-quality images, so they require higher resolution, but do not require high frame rates. Based on the above description, in this embodiment, the frame rate of the high-speed photosensitive element is higher than that of the general photosensitive element, and the resolution of the high-speed photosensitive element is lower than that of the general photosensitive element. In addition, the high-speed photosensitive element and the general photosensitive element can be, for example, CMOS photosensitive elements, but are not limited thereto. Hereinafter, the frame rate of a general photosensitive element will be referred to as the first frame rate, and the frame rate of a high-speed photosensitive element will be referred to as the second frame rate.

In this embodiment, the first photosensitive element 101 and the second photosensitive element 102 are arranged as adjacently as possible in the scanning device 10.

images Pn and Pn+1. In this embodiment, the displacement calculation unit 103 performs image comparison by, for example, taking the feature block TP1 in the image Pn as a reference feature, moving the reference feature in the image Pn+1 and calculating the similarity to find the position of a similar feature block TP2 in the image Pn+1. To calculate the similarity, for example, the maximum correlation coefficient (Maximum correlation efficient) method or the minimum error method, such as the minimum mean-square error (MMSE), can be used.

After finding the position of the feature block TP2 in the image Pn+1, the displacement calculation unit 103 calculates the position variation of the feature blocks TP1 and TP2 based on the relative positions of the feature blocks TP1 and TP2, that is, calculating the relative displacement ($\Delta x$ and $\Delta y$) of the block TP1 moving from the position in the image Pn to the position of the feature block TP2 in the image Pn+1. The displacement ($\Delta x$ and $\Delta y$) is used as the displacement data $\Delta(x, y)_t$.

For the received second frame-rate images, the displacement calculation unit 103 performs comparison to obtain the displacement relationship ($\Delta x$ and $\Delta y$) between any two adjacent images (such as the above-mentioned images Pn and Pn+1) in the above manner, and based on this, the calculated displacement data Δ(x, y)t is continuously output. The output frequency of the displacement data is the same as the second frame rate. In this way, the scanning trajectory of the scanning device 10 can be known.

The general photosensitive element 101, for example, outputs first frame-rate images as image data at an output frequency of the first frame rate. In addition, the scanning device 10 of this embodiment further has a memory (not shown), which can be used as a buffer device for displacement data and image data.

Since the displacement data and the image data are heterogeneous data, not only the output frequencies of the displacement data and the image data are different, but also attributes of the displacement data and the image data are different, further data processing is required to integrate the two heterogeneous data. Hereinafter, the operation of the data processing unit 104 of the scanning device 10 according to this example will be described in detail.

Figure 3:
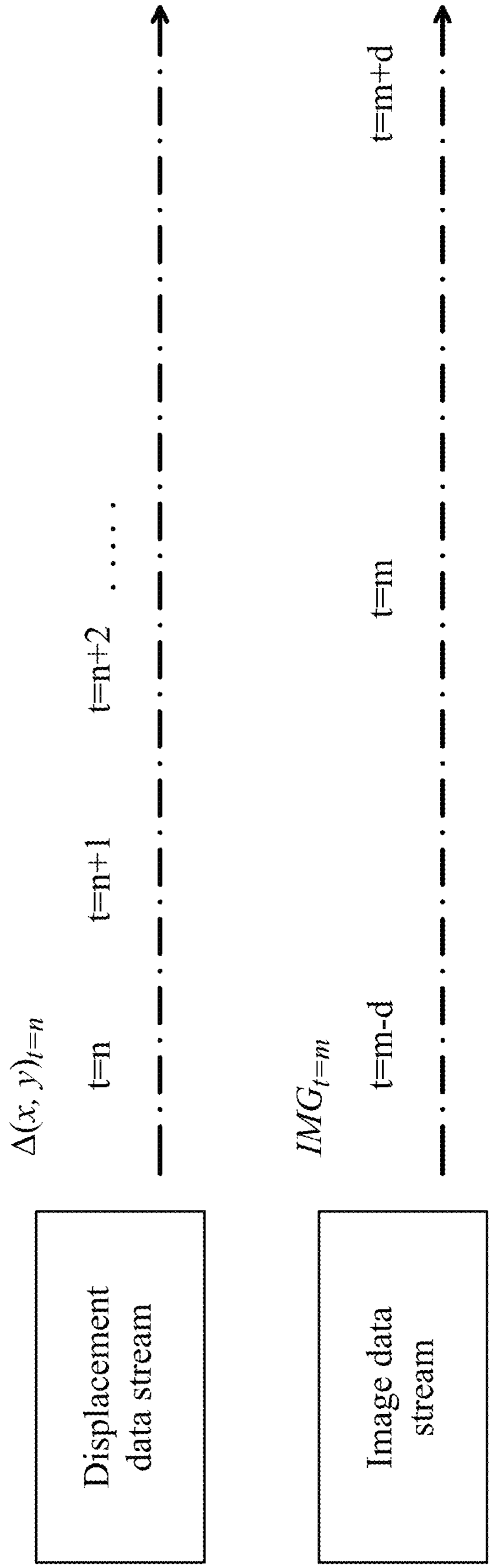
FIG. 3 shows a schematic time series diagram of the displacement data stream and the image data stream in this embodiment.

FIG. 3 shows a schematic time series diagram of the displacement data stream and the image data stream in this embodiment. In FIG. 3, Δ(x,y) represents the displacement data, n represents the time of each displacement data, $\Delta(x,y)_{t=n}$, $\Delta(x,y)_{t=n+1}$, $\Delta(x, y)_{t=n+2}$ . . . , etc. respectively representing the displacement data Δ(x,y) at time t=n, t=n+1 and t=n+2 . . . , etc. In FIG. 3, m represents the time of each of the image data, and $IMG_{t=m}$ represents the image data at time t=m. When the data processing unit 104 receives the image data $IMG_{t=m}$, it will calculate the sum of the displacements between this image (called the current image) $IMG_{t=m}$ and the previous image $IMG_{t=m-1}$. The sum of the displacements is expressed as:

$$\delta(x, y)_{t=m} = \sum_{t>m-d}^{t\leq m} \Delta(x, y)_t,$$

wherein, d is the time difference between two images in the image data stream (for example, d is the time difference between the current image and the previous image in the first frame-rate images). $\delta(x,y)_{t=m}$ indicates the sum of the displacements from $\Delta(x,y)_{t=m-d}$ to $\Delta(x,y)_{t=m}$ of all two adjacent second frame-rate images, within the period of m−d≤t≤m, that is, it represents the displacement from the previous image to the current image.

Finally, taking time t=m as an example, the data format output by the data processing unit 104 is ($IMG_{t=m}$, $\delta(x,y)_{t=m}$). In this way, the current image, and the displacement of the current image and the previous image can be associated with each other.

In this embodiment, the scanning device 10 is, for example, an oral scanning device, and the target object is a tooth or an intraoral tissue. Based on the above description, the scanning device 10 can output data ($IMG_t$, $\delta(x,y)_t$) corresponding to the image and displacement. Therefore, the displacement data $\delta(x,y)_t$ can be used to construct an accurate scanning (movement) trajectory. With the image data $IMG_t$ corresponding to the trajectory, when modeling and constructing panoramic images, errors can be reduced to obtain good quality results.

In this embodiment, the scanning device 10 further includes, for example, a digital signal processor (DSP), a controller, an application specific integrated circuit (ASIC), a field programmable gate array (FPGA), and other hardware, to implement the functions of the displacement processing unit 103 and the data processing unit 104 through loading programs, but it is not limited to this.

Figure 4:
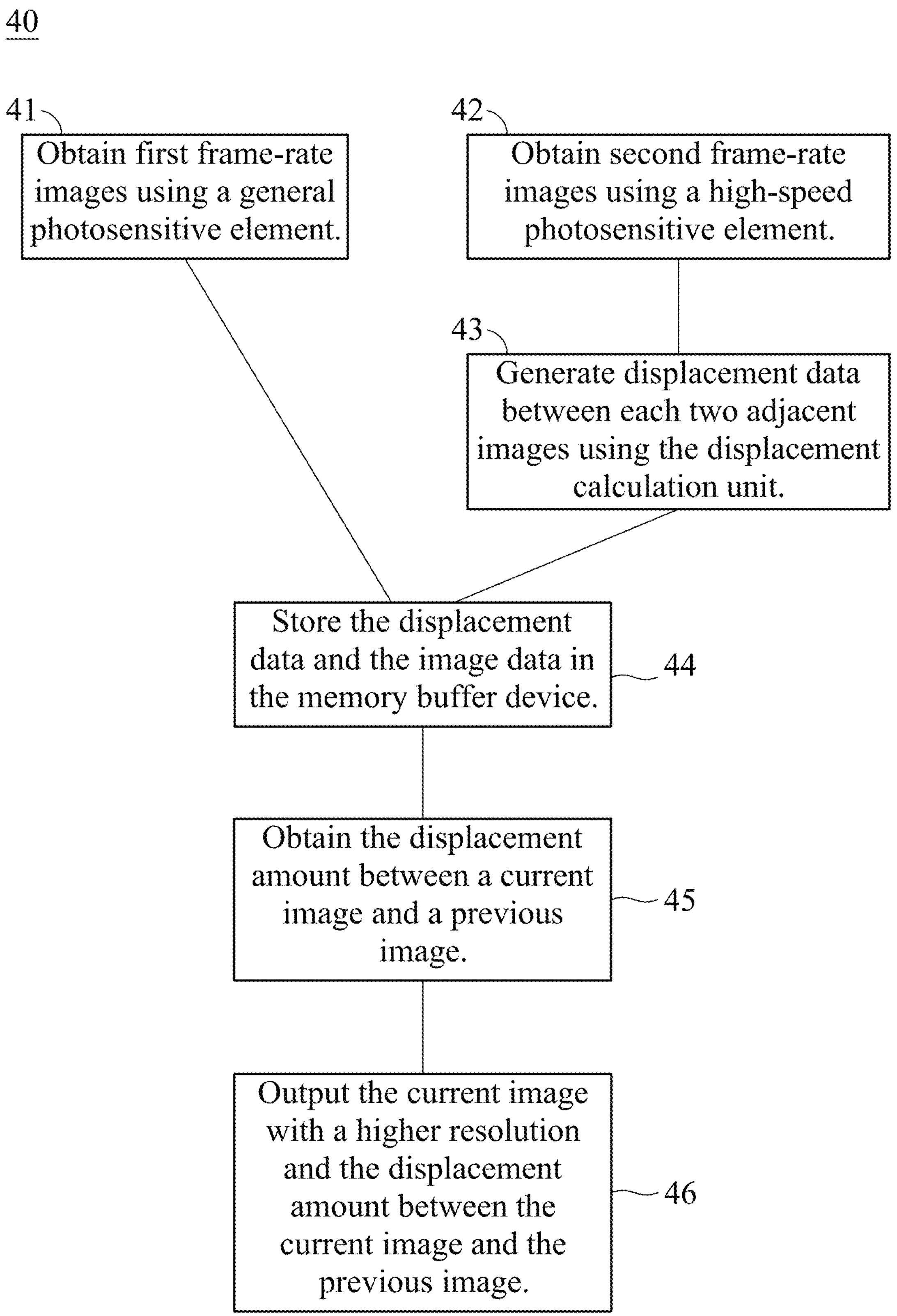
FIG. 4 shows a flow chart of a scanning method applied to the scanning device of the present invention.

FIG. 4 shows a flow chart 40 of the scanning method applied to the scanning device 10 of the present invention. First, after the scanning device 10 starts operating, in step S41, a general photosensitive element 101 with a first frame rate (FPS) is used to capture a target object, and obtain a plurality of first frame-rate images. In step S42, a high-speed photosensitive element 102 with a second frame rate is used to capture the target object and obtain a plurality of consecutive second frame-rate images as image data. The second frame rate is higher than the first frame rate, and the resolution of the high-speed photosensitive element 102 is lower than that of the general photosensitive element 102. Next, in step S43, the displacement calculation unit 103 calculates the position variations of every two adjacent images in the consecutive second frame-rate images to generate multiple displacement data between every two adjacent images in the second frame-rate images. In step S44, the displacement data and the image data corresponding to the first frame-rate images are stored in the memory buffer device. In step S45, the data processing unit 104 obtains the displacement amount between the current image and a previous image of the current image, received from the first frame-rate images, based on the displacement data. Finally, in step S46, the data processing unit 104 outputs the current image with a higher resolution and the displacement amount between the current image and the previous image.

The scanning method of this embodiment, further includes: summing up multiple displacement data between every two adjacent images in the second frame-rate images obtained during the period from receiving the previous image to receiving the current image in the first frame-rate images, to determine the amount of displacement between the current image and the previous image.

The embodiments of the present invention have been described in detail above. It should be noted that the above-mentioned embodiments are only exemplary examples to illustrate the principles and effects of the present invention, and are not used to limit the scope of the present invention. The person skilled in the art can make various changes and modifications without departing from the spirit and scope of the present invention. Therefore, the scope of the present invention shall be determined by the appended claims.

What is claimed is:

1. A scanning device, capable of obtaining position information while scanning a target object, comprising:

a first imaging device, configured to scan and photograph the target object at a first frame rate (Frames per Second, FPS) to obtain a plurality of first frame-rate images;

a second imaging device, configured to scan and photograph the target object at a second frame rate that is higher than the first frame rate to obtain a plurality of consecutive second frame-rate images;

a displacement calculation unit, configured to calculate position variations between every two adjacent images in the second frame-rate images, thereby generating a plurality of displacement data; and a data processing unit, configured to obtain a displacement amount between a current image and a previous image received from the first frame-rate images based on the displacement data;

wherein the first imaging device and the second imaging device are not the same component.

2. The scanning device as claimed in claim 1, wherein the data processing unit sums up multiple displacement data between every two adjacent images in the second frame-rate images, obtained during the period from receiving the previous image to receiving the current image in the first frame-rate images, to determine the amount of displacement between the current image and the previous image.

3. The scanning device as claimed in claim 2, wherein the displacement calculation unit is further configured to:

compare a first image and an adjacent second image in the second frame-rate images;

find a first block and a second block with high similarity in the first image and the second image, respectively;

based on the relative positions of the first block and the second block, calculate the displacement amount of the first block and the second block in the first image and the second image, for use as the displacement data.

4. The scanning device as claimed in claim 3, wherein the displacement calculation unit finds the first block and the second block with high similarity based on the principle of highest correlation coefficient or the smallest error.

5. The scanning device as claimed in claim 1, wherein the first imaging device has a first resolution, the second imaging device has a second resolution, and the second resolution is lower than the first resolution.

6. The scanning device as claimed in claim 1, wherein first imaging device and the second imaging device are arranged adjacent to one another in the scanning device.

7. The scanning device as claimed in claim 1, wherein the scanning device is an oral scanning device, and the target object is teeth or oral tissue.

8. The scanning device as claimed in claim 1, further comprising one or more light sources.

9. A scanning method, capable of obtaining precise position information while scanning a target object, comprising:

by a first imaging device, photographing the target object at a first frame rate (Frames per Second, FPS) to obtain a plurality of first frame-rate images;

by a second imaging device, photographing the target object at a second frame rate to obtain a plurality of consecutive second frame-rate images, wherein the second frame rate is higher than the first frame rate;

calculating the position variations between every two adjacent images in the consecutive second frame-rate images, thereby generating a plurality of displacement data; and based on the displacement data, obtaining a displacement amount between the current image and a previous image received from the first frame-rate images;

wherein the first imaging device and the second imaging device are not the same component.

10. The scan method as claimed in claim 9, further comprising:

summing up multiple displacement data between every two adjacent images in the second frame-rate images obtained during the period from receiving the previous image to receiving the current image in the first frame-rate images, to obtain the displacement amount between the current image and the previous image.

* * * * *